United States Patent [19]

Matsuhisa et al.

[11] Patent Number: 4,976,903
[45] Date of Patent: Dec. 11, 1990

[54] SHAPING MOLDS AND SHAPING OF CERAMIC BODIES BY USING SUCH SHAPING MOLDS

[75] Inventors: Tadaaki Matsuhisa, Kasugai; Hiroyuki Iwasaki, Nagoya, both of Japan

[73] Assignee: NGK Insulators, Ltd., Japan

[21] Appl. No.: 217,407

[22] Filed: Jul. 11, 1988

[30] Foreign Application Priority Data

Jul. 20, 1987 [JP] Japan ............................ 62-180584

[51] Int. Cl.⁵ .............................................. C04B 33/28
[52] U.S. Cl. ...................................... 264/86; 264/63; 249/134
[58] Field of Search ..................... 264/86, 63; 249/134

[56] References Cited

U.S. PATENT DOCUMENTS

| | | | |
|---|---|---|---|
| 3,481,010 | 12/1969 | Colburn et al. | 264/86 |
| 4,460,527 | 7/1984 | Kato | 264/86 |
| 4,743,300 | 5/1988 | Brinduse et al. | |

FOREIGN PATENT DOCUMENTS

| | | | |
|---|---|---|---|
| 0140682 | 5/1985 | European Pat. Off. | 264/86 |
| 818748 | 10/1951 | Fed. Rep. of Germany . | |
| 2417 | 7/1954 | German Democratic Rep. . | |

OTHER PUBLICATIONS

Soviet Inventions Illustrated, Sections P, Q, week 8806, Mar. 23, 1988, Derwent Publications Ltd., London, p. 64, SU-1 318 411.
Kunststoff-Handbuch, vol. IX, 1971, Verlag, Carl Hanser, Munchen, p. 362, lines 3-6.
Elias, Makromolekule, 4th Edition, 1981, Verlag, Huthig & Wepf, Basel, p. 404.

Primary Examiner—James Derrington
Attorney, Agent, or Firm—Parkhurst, Wendel & Rossi

[57] ABSTRACT

A shaping mole including a container section which is to receive a water-containing ceramic composition and which is defined by a non-permeable mold or a combination of a non-permeable mold and a permeable mold. A part of a shaping surface of the non-permeable mold is made of a material having a contact angle of not less than 80° for water. A process for shaping ceramic articles by using such a mold is also disclosed, which including, the steps of preparing a water-containing ceramic composition comprising a ceramic powder containing a sintering assistant, a shaping assistant, and water, pouring the water-containing ceramic material into the shaping mold, pressing the ceramic composition, and releasing the molding from the mold. The water-containing ceramic material is prepared by using at least a gelatinizable water-soluble binder as the shaping assistant.

2 Claims, 2 Drawing Sheets

SHAPING MOLDS AND SHAPING OF CERAMIC BODIES BY USING SUCH SHAPING MOLDS

BACKGROUND OF THE INVENTION (1) Field of the Invention

The present invention relates to shaping molds and a process for shaping ceramic articles by using such shaping molds. More particularly, the invention relates to shaping molds each comprising a non-permeable mold of which the molding surface is partially made of a material having a contact angle of not less than 80° for water, and also to a process for shaping ceramic articles by using such shaping molds.

(2) Related Art Statement

As processes for producing ceramic-shaped bodies having relatively complicated shapes, injection molding, pressure casting, and wet type pressing have heretofore been known.

In the injection molding, ceramic-shaped bodies are obtained by mixing a ceramic powder with an organic binder comprising a resin such as polyethylene or polystyrene and wax, shaping the thus obtained raw material mixture by injection molding, and dewaxing the shaped bodies.

In the pressure casting, ceramic-shaped bodies are obtained by mixing a ceramic powder, water and a shaping assistant such as a deflocculant to obtain a slip, pouring the slip into a casting mold, and casting it under pressure.

In the wet type pressing, ceramic-shaped bodies are obtained by mixing and kneading a ceramic powder, water, and a shaping assistant such as a binder, deairing the mixture in vacuum to obtain a body, placing the body in a mold, and pressing it.

However, the above-mentioned conventional injection molding technique has a shortcoming in that it takes a long time to dewax shaped bodies obtained by the injection molding.

The pressure casting and the wet type pressing have unfavorably poor shape retention after the shaping and bad mold releasability.

SUMMARY OF THE INVENTION

It is an object of the present invention to provide novel shaping molds and a process for shaping ceramic bodies by using such shaping molds, which solve the shortcomings possessed by these conventional techniques.

The above-mentioned object according to the present invention can be accomplished as follows:

The shaping mold according to the present invention comprises a container section which is to receive a water-containing ceramic composition and which is defined by a non-permeable mold or a combination of a non-permeable mold and a permeable mold, wherein a part of a shaping surface of the non-permeable mold is made of a material having a contact angle of not less than 80° for water.

The process for shaping ceramic articles comprises the steps of preparing a water-containing ceramic composition comprising a ceramic powder containing a sintering assistant, a shaping assistant, and water, pouring the water-containing ceramic composition into a mold, pressing the ceramic composition, and then releasing it from the mold. The water-containing ceramic composition is prepared by using at least a gelatinizable water-soluble binder as the shaping assistant. A non-permeable mold or a combination of a non-permeable mold and a permeable mold is used as the mold, and a part of a shaping surface of the non-permeable mold is made of a material having a contact angle of not less than 80° for water.

These and other objects, features and advantages of the invention will be appreciated when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE ATTACHED DRAWINGS

For a better understanding of the invention, reference is made to the attached drawings, wherein:

FIG. 1 is a sectional view of a ceramic turbine rotor-pressure casting mold as one embodiment of the molds according to the present invention; and FIG. 2 is a sectional view of another embodiment of the molds according to the present invention.

DETAILED DESCRIPTION OF THE INVENTION

Figure 1:
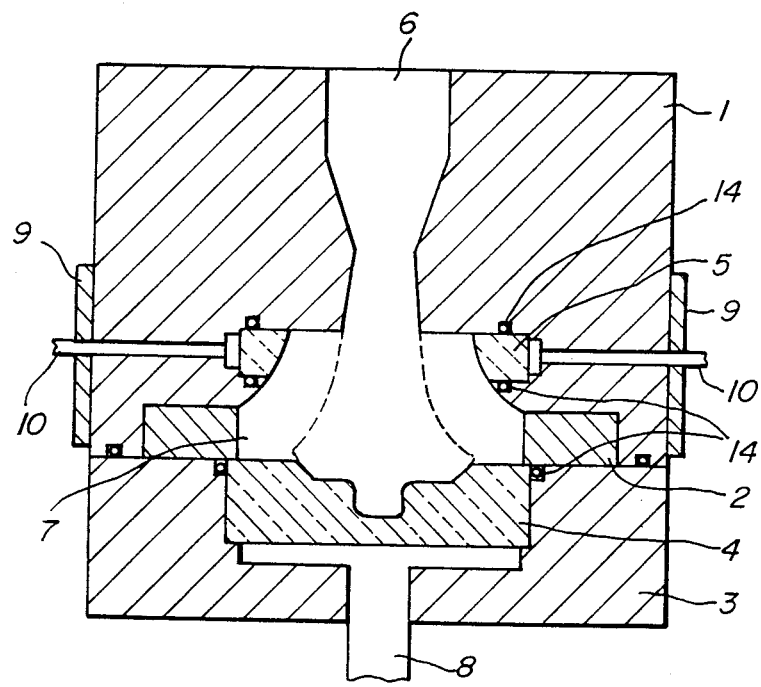

The molds according to the present invention are characterized in that a part of the shaping surface of the non-permeable mold is made of a material having a contact angle of not less than 80° for water.

That is, the present inventors had found out that mold releasability for shaped bodies can be improved in a mold comprising a non-permeable mold or a combination of a non-permeable mold and a permeable mold by making a part of the shaping surface of the non-permeable mold from a material having a contact angle of not less than 80°, preferably not less than 85°, and more preferably not less than 90°, for instance, a fluoroplastic such as polytetrafluoroethylene, and have accomplished the present invention based on the above finding.

If the contact angle for water is less than 80°, mold releasability becomes poor. Particularly in the case of shaping complicatedly shaped articles such as ceramic turbine rotors, use of a material having a contact angle of not less than 90° for water is preferred, because they will not be damaged by a molding-releasing operation.

As the material having the contact angle of not less than 80° for water, which constitutes a part of the shaping surface of the non-permeable mold, mention may be made of fluoroplastics such as polytetrafluoroethylene, polyfluorovinyl, polyfluorovinylidene, polytrifluorochloroethylene, and tetrafluoroethyleneperfluoroalkylvinyl ether copolymer as well as polypropylene, various waxes, etc.

A part of the shaping surface of the non-permeable mold may be made of any one of the above-mentioned materials, for example, by constituting the non-permeable mold itself with such a material. From the economical standpoint of view, however, it is preferable to coat the shaping surface of the non-permeable mold. When a fluoroplastic is used as the above material, it may easily directly be coated onto a non-permeable mold made of a metal.

The mold according to the present invention can effectively be applied to ceramic articles having blades of a complicated shape, such as ceramic turbine rotors.

In such a case, a portion of the mold for forming the blades is preferably made non-permeable. A part of a shroud line portion of the non-permeable mold for the formation of the blades is preferably provided with a permeable mold. The shroud line portion is a location where deposition is difficult. Thus, when the permeable mold is provided there, the deposition is started while water is discharged under suction. Consequently, a uniform shaped body having the defect-free blades can be obtained.

The water-containing ceramic composition used in the present invention comprises a ceramic powder containing a sintering assistant, a shaping assistant and water.

As the ceramic powder, use may be made of conventionally known oxides such as alumina and zirconia, as well as nitrides such as silicon nitride, and carbides such as silicon carbide, known as new ceramics and their composite materials known as new ceramics.

As the sintering assistant, no particular limitation is posed upon the kind thereof. Use may be made of ordinarily known oxides, nitrides, and carbides of elements such as Mg, Al, Y, Ce, Zr, Sr, B, and Ta, which may appropriately be selected.

As the shaping assistant, at least a gelatinizable water-soluble binder is used. For instance, methyl cellulose, hydroxypropylmethyl cellulose, etc. may be used. In this case, when water-soluble binders having different gelatinizing temperatures are used in combination, they need to be selectively employed depending upon raw materials to be shaped, the shaping assistant, etc. In addition, an organic material such as polyvinyl alcohol or polyethylene glycol as a water-soluble organic compound may be used.

As the permeable mold used in the present invention, conventionally known products may be used. The permeable mold needs to have good permeability to assure excellent solvent-removing and drying efficiencies, and must the guarantee strength of the mold itself. Ordinarily, permeable molds having an average pore diameter of 0.1 to 50 μm are used. In addition, permeable molds having a double layer structure which consists of a shaping surface layer having the average pore diameter of 0.1 to 50 μm and a lower surface layer having the greater average pore diameter of 50 to 500 μm may be employed. No limitation is posed upon a material of the permeable mold. Materials having good water absorbing properties, such as gypsum, plastics, ceramics, metals and composite materials thereof may be used.

As the non-permeable molds employed in the present invention, use may be made of heretofore generally used products. For instance, molds made of metal, synthetic resin, or rubber may be used.

Ceramic articles having excellent mold releasability may be shaped by using the above-mentioned mold according to the present invention.

In the following, the process for shaping ceramic articles by using the mold according to the present invention will be explained.

The mold is first used as a pressing mold. As the pressing techniques, pressure casting and wet type pressing may be employed. In the pressure casting, slip containing a greater amount of water is used as a water-containing ceramic composition. On the other hand, the wet type pressing uses a so-called body having a smaller content of water as the water-containing ceramic composition.

The water-containing ceramic composition to be used in the present invention is prepared from a ceramic powder containing a sintering assistant and water by using at least a gelatinizable water-soluble binder as a molding assistant.

The mixing ratios in the water-containing ceramic composition is as follows:

In the case of the pressure casting using a slip, the ceramic composition consists essentially of 100 parts by weight of a ceramic powder, 30 to 100 parts by weight of water, 0.1 to 10 parts by weight of a gelatinizable binder, and 0.1 to 15 parts of a shaping assistant. Preferably, the ceramic composition consists essentially of 100 parts by weight of the ceramic powder, 35 to 85 parts by weight of water, 0.5 to 7 parts by weight of the gelatinizable binder, and 0.1 to 10 parts by weight of the shaping assistant. If the mixing ratio of water is less than 30 parts by weight, fluidity of the slip becomes so low that a mixing operation becomes insufficient and the products are nonuniform in quality. If water exceeds 100 parts by weight, slip is settled unfavorably or shaping time becomes longer. If the mixing ratio of the gelatinizable binder is less than 0.1 parts by weight, the strength of the shaped body is so small that shape retention becomes poor. On the other hand, if it exceeds 10 parts by weight, a greater amount of water is required to make a slip, which results in a prolonged dewatering time.

In the case of the wet type pressing with use of a body, the ceramic composition consists essentially of 100 parts by weight of a ceramic powder, 15 to 40 parts by weight of water, 0.1 to 15 parts by weight of a gelatinizable binder, 0.1 to 15 parts by weight of a shaping assistant. Preferably, the ceramic composition consists essentially of 100 parts by weight of the ceramic powder, 20 to 35 parts by weight of water, 0.5 to 10 parts by weight of the gelatinizable binder, and 0.1 to 10 parts by weight of the shaping assistant. If the mixing ratio of water is less than 15 parts by weight, kneadability is poor so that shaped bodies having uniform quality cannot be obtained. If it exceeds 40 parts by weight, the density of the obtained shaped bodies is so low that firing shrinkage becomes greater and that shaped bodies having high dimensional precision are difficult to obtain. Further, if the gelatinizable binder is less than 0.1 parts by weight, the strength of the shaped bodies is so low that shape retention is poor. On the other hand, if it is more than 15 parts by weight, the time necessary for dewaxing unfavorably becomes longer and shaped bodies are likely to be cracked.

Shaped bodies are obtained by pouring the thus prepared water-containing ceramic composition into the mold according to the present invention, pressing the ceramic composition, or pouring the ceramic composition into the mold under pressure, and releasing it from the mold.

When the water-containing ceramic composition is to be pressed, it is preferable to heat the shaping mold up to temperatures higher than the gelatinizable temperature of the water-soluble binder. In this case, the strength of the molding increases and shape retention becomes improved, so that cracks are difficult to occur. Therefore, since a thin portion or a slender portion of the shaped body needs strength during mold releasing, the above heating operation is preferred for shaped bodies having a thin portion or the like.

On the other hand, the pressurizing pressure at a pouring portion is preferably not less than 5 kg/cm$^2$, more preferably not less than 10 kg/cm$^2$. If the pressure is less than 5 kg/cm$^2$, the shaping time becomes greater, and the density of the shaped bodies becomes lower. Consequently, the shaped bodies are likely to be deformed.

In addition, although high pressures greater than 700 kg/cm$^2$ may be employed, it is preferable to effect the molding at not greater than 700 kg/cm$^2$, because otherwise the mold becomes greater and heavier and a molding machine becomes of a greater size due to the high pressure.

Next, the mold according to the present invention will be explained with reference to the attached drawings.

FIG. 1 is a sectional view illustrating a ceramic turbine rotor-pressure casting mold as an embodiment of the molds according to the present invention. A reference numeral 7 is a container section surrounded at its side portion with a non-permeable mold 1 and a non-permeable slide core 2. A permeable mold 4 is arranged at a lower side of the container section 7. A discharge opening 8 is provided under the permeable mold 4. Both the permeable mold 4 and the discharge opening 8 are integrally surrounded with a non-permeable mold 3 at their side portions. In the non-permeable mold section 1, a shroud line portion is provided to form blades of the ceramic turbine rotor, and a permeable mold 5 is provided in the shroud line portion. In order to discharge water through the permeable mold 5, a discharge opening 10 is communicated with the exterior of the shaping mold.

Further, a band-like heater 9 is fitted surrounding the whole mold. A reference numeral 6 is a pouring opening for a water-containing ceramic composition.

The container section 7 is designed in a given shape to be in conformity with that of intended articles.

The non-permeable mold 1 and the non-permeable mold 3 are separately formed from the standpoint of production readiness and workability.

In the following, the present invention will be explained with respect to specific examples, but the invention should not be interpreted to be limited thereto.

EXAMPLES 1-6 AND COMPARATIVE EXAMPLES 1-2

Into 100 parts by weight of an Si$_3$N$_4$ powder (average particle diameter: 0.7 $\mu$m) containing a sintering assistant were mixed 78 parts by weight of water, 1 part by weight of methyl cellulose, 1 part by weight of triethylamine (deflocculant), and 0.25 part by weight of n-octyl alcohol (defoaming agent) to obtain a slip. The pH and the viscosity of the slip were 11.90 and 8 poises, respectively.

Next, in order to remove foams contained in the slip, the slip was desired for 5 minutes in an atmosphere having a vacuum degree of 75 cmHg under stirring.

A pressure casting mold for a turbine rotor [blade diameter and height: 85 mm($\phi$) and 30 mm, respectively] shown in FIG. 1 was used and heated at a temperature of 60° C., and the slip treated above was poured into the container section 7 through the pouring opening 6. Then, while the slip was pressed through the pouring opening 6, water was discharged under suction via the discharge opening 8. The slip was molded under conditions shown in Table 1, and results of Example 1 were obtained. A sufficient sealing was applied to facing surfaces of the molds to prevent leakage of the slip. Further, the above slip was used, and shaping was effected under shaping conditions shown in Table 1 while conditions, i.e., presence or absence of a Teflon [polytetrafluoroethylene, contact angle ($\theta$): 108°] coating on the shaping surface of the non-permeable slide core, heating or not heating of the shaping mold, and pressurizing pressure, were varied. Results of Examples 1, 2, 3, 4, 5 and 6 and Comparative Examples 1 and 2 were shown in Table 1.

As is evident from Table 1, good shaped bodies having more excellent mold releasability and being free from cracks and deformation when visually viewed from the exterior (hereinafter referred to briefly "outer cracks and deformation") could be obtained by using the mold and the shaping process according to the present invention. Further, when water was discharged under suction through the permeable mold 5 at the shroud line portion, density of the shaped bodies was uniformalized to offer more excellent shaped bodies.

EXAMPLES 7-11 AND COMPARATIVE EXAMPLES 3 TO 5

Figure 2:
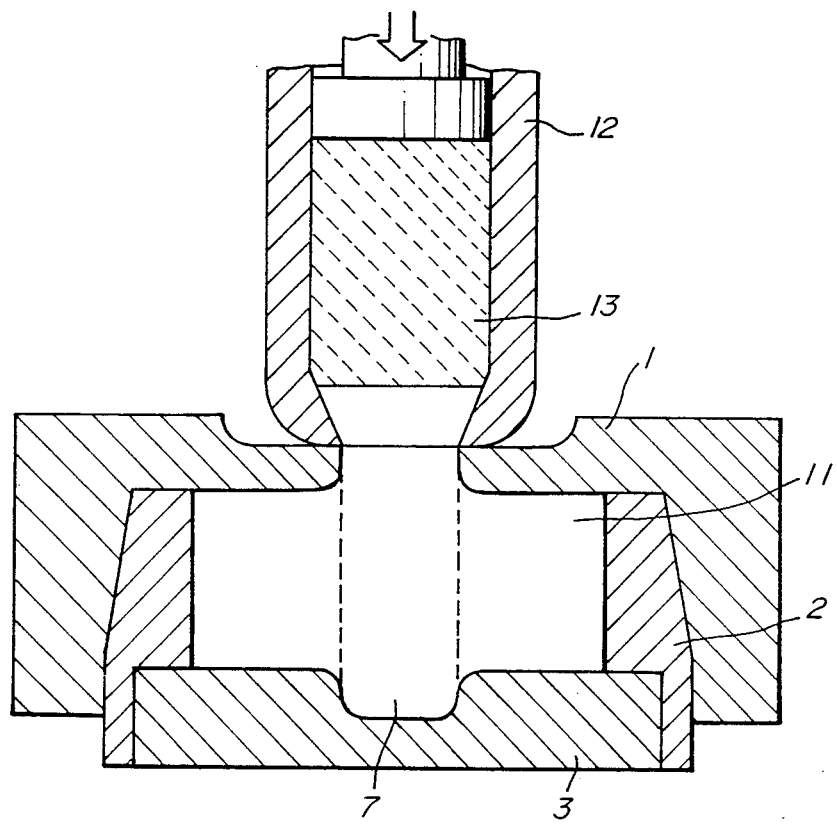

An SiC powder (average particle diameter: 1 $\mu$m) containing a sintering assistant, a gelatinizable binder, a shaping assistant, and water were mixed according to a recipe of Table 2, and kneaded by using a pressurizing kneader. Then, a body having a shape of 60 mm($\phi$)×70 mm(long) was extruded by using a vacuum pugmill (vacuum degree: 73 cmHg). Then, materials having different contact angles were deposited to blades 11 in a four wing-like fashion [blade diameter and height: 90 mm($\phi$) and 40 mm high] as shown in FIG. 2, and the body 13 prepared above was poured under pressure of 500 kg/cm$^2$ under shaping conditions of Table 2. Then, a pressed body was released from the mold one minute later to obtain a shaped body shown in Table 2.

As is evident from Table 2, shaped bodies having more excellent properties could be obtained by applying a material having a contact angle ($\theta$) of not less than 80° to the surface of the shaping mold. Further, it is clear that when turbine rotrs, etc. having a more complicated form are to be shaped, it is necessary to use a material having a contact angle ($\theta$) of not less than 90° toward even slight breakage, because of the difficulty releasing the bodies from the mold.

Next, by using a moisture-controllable thermostat, the thus shaped bodies were dried at 100° C. for 5 hours after being heated at a rate of 5° C./hr while humidity gradually lowered from 98%. Then, each of the dried bodies was dewaxed at 500° C. for 10 hours by using a hot air circulating type electric kiln, and charged into an ice bag, which was rubber-pressed at a pressure of 3 tons/cm$^2$. Thereafter, the rubberpressed bodies were fired at 2,200° C. in an Ar atmosphere for one hour, thereby obtaining sintered bodies.

TABLE 1

| | Shaping conditions | | | | | | | | Results after shaping | | | | |
|---|---|---|---|---|---|---|---|---|---|---|---|---|---|
| | Pressure (kg/cm²) | Teflon-coating on non-permeable slide core | | Heating of mold | | Sucked through permeable mold section at shroud line portion | | Casting time (min.) | Mold releas-ability | Outer cracks | Deforma-tion | Density | |
| | | coated | not coated | heated (60° C.) | not heated (20° C.) | sucked | not sucked | | | | | hub | blade |
| Example 1 | 3 | O | | O | | O | | 67 | good | not cracked | slightly deformed | 1.25 | 1.24 |
| Example 2 | 5 | O | | O | | | O | 58 | good | not cracked | not deformed | 1.38 | 1.32 |
| Example 3 | 10 | O | | O | | | O | 48 | good | not cracked | not deformed | 1.38 | 1.33 |
| Example 4 | 50 | O | | O | | O | | 22 | good | not cracked | not deformed | 1.48 | 1.50 |
| Example 5 | 100 | O | | O | | | O | 9 | good | not cracked | not deformed | 1.60 | 1.55 |
| Example 6 | 150 | O | | | O | | O | 90 | good | not cracked | slightly deformed | 1.65 | 1.63 |
| Comparative Example 1 | 0 | O | | O | | | O | could not be shaped in 120 min. | — | — | — | — | — |
| Comparative Example 2 | 10 | | O | O | | | O | 47 | bad | cracked | not deformed | 1.39 | 1.33 |

TABLE 2

| | Mixing ratio (parts by weight) | | | | | Blade-fixing material | | Results after shaping | | |
|---|---|---|---|---|---|---|---|---|---|---|
| | SiC | Gelati-nizable binder methyl cellulose | Shaping assistant PVA | ether type non-ion activating agent | Water | Kind | Contact angle θ (°) | Mold releas-ability | Outer cracks | Deforma-tion |
| Example 7 | 100 | 0.5 | 0 | 1 | 20 | polyfluorovinyl | 80 | good*1 | not cracked | not deformed |
| Example 8 | 100 | 3 | 2 | 1 | 25 | polyethylene | 94 | good | not cracked | not deformed |
| Example 9 | 100 | 5 | 0 | 1 | 25 | tetrafluoroethylene-perfluoroalkylvinyl ether copolymer | 107 | good | not cracked | not deformed |
| Example 10 | 100 | 10 | 0 | 1 | 30 | polyvinyl chloride | 87 | good*2 | not cracked | not deformed |
| Example 11 | 100 | 15 | 0 | 1 | 30 | polytrifluorochloro-ethylene | 90 | good | not cracked | not deformed |
| Comparative Example 3 | 100 | 20 | 0 | 1 | 30 | nylon | 70 | bad | cracked | not deformed |
| Comparative Example 4 | 100 | 5 | 0 | 1 | 25 | nylon | 70 | bad | cracked | not deformed |
| Comparative Example 5 | 100 | 0 | 5 | 1 | 25 | no (Fe) | 0 | bad | cracked | deformed |

*1 Slightly broken at two locations of blade tip end portion
*2 Slightly broken at one location of blade tip end portion As is evident from the aforegoing explanation, excellent shaped bodies having good mold releasability and being free from other cracks or deformation can be obtained by using the mold and the shaping process using such of the present invention.

What is claimed is:

1. A process for shaping ceramic bodies, comprising the steps of:
    preparing a ceramic composition comprising ceramic powder, a sintering aid, a shaping assistant consisting of a gelatinizable water-soluble binder, and water;
    pouring the ceramic composition into a shaping mold, said shaping mold comprising a non-permeable mold or a combination of a non-permeable mold and a permeable mold, and at least a portion of a shaping surface of said non-permeable mold consisting of a material having a contact angle with water of not less than 80°;
    pressing the ceramic composition to form a shaped ceramic body;
    heating said shaping mold to a temperature higher than a gelatinization temperature of said gelatinizable water-soluble binder to gelatinize said binder and strengthen said shaped ceramic body; and
    releasing the shaped ceramic body from said shaping mold.

2. The process of claim 1, wherein said shaping mold is for a ceramic turbine rotor.

* * * * *